United States Patent [19]
Lee

[11] Patent Number: 5,143,047
[45] Date of Patent: * Sep. 1, 1992

[54] MATERIAL AND METHOD FOR FAST GENERATION OF HYDROGEN GAS AND STEAM

[75] Inventor: Woodrow W. Lee, Potomac, Md.

[73] Assignee: The United States of America as represented by the Secretary of the Navy, Washington, D.C.

[*] Notice: The portion of the term of this patent subsequent to Oct. 1, 2008 has been disclaimed.

[21] Appl. No.: 718,123

[22] Filed: Jun. 20, 1991

[51] Int. Cl.$^5$ ............................................. F24J 1/00
[52] U.S. Cl. ................................. 126/263; 126/269; 122/21
[58] Field of Search ............ 126/263, 206, 269, 271.3; 122/21

[56] References Cited

U.S. PATENT DOCUMENTS

| | | | |
|---|---|---|---|
| 4,643,166 | 2/1987 | Hubele et al. | 126/263 |
| 4,730,601 | 3/1988 | Hubele et al. | 126/263 |
| 5,020,509 | 6/1991 | Suzuki | 126/263 |
| 5,052,272 | 10/1991 | Lee | 89/7 |

Primary Examiner—Larry Jones
Attorney, Agent, or Firm—Kenneth E. Walden; Roger D. Johnson

[57] ABSTRACT

A high power pulse of electrical current causes a metal conductor to explode and initiate a reaction between an aluminum or aluminum alloy powder and water which generates hydrogen gas at a high temperature and pressure. The reaction mixture is released into a second larger chamber equipped with heat exchanger which extracts useful heat energy and cools down the reaction mixture. The hydrogen gas is then separated from the solid metal oxide byproducts in the cooled reaction mixture.

20 Claims, 2 Drawing Sheets

MATERIAL AND METHOD FOR FAST GENERATION OF HYDROGEN GAS AND STEAM

BACKGROUND OF THE INVENTION

This invention relates to the production of hydrogen and heat energy and more particularly to the production of hydrogen and heat energy by reacting a metal with water.

It has been proposed to replace conventional hydrocarbon fuels with cleaner burning hydrogen in internal combustion engines. Unfortunately existing methods of storing hydrogen require heavy tanks for the compressed gas or complicated vessels for the liquid that are uneconomical to use. The metal hydride, although it can be claimed as the best existing method of storing hydrogen, is still too heavy to be used as a mobile hydrogen storage medium. Additionally, the large stored quantities of hydrogen require special safety precautions. It would be desirable to provide a method of generating the hydrogen gas fuel as needed.

Some metals like aluminum, magnesium, or lithium react with water, spontaneously generating hydrogen gas and heat. Among these reactive metals, aluminum is the most abundant, cheapest and safest metal. But, the reaction between aluminum and water is not sustained at ambient temperature due to the protective oxide layer formed on the metal surface. Therefore, the use of aluminum as a fuel to generate heat and hydrogen gas requires that the protective layer be efficiently and continuously removed.

European patent No. 0 055 134 B1 (1986) discloses a method for the production of hydrogen by inducing electrical discharge between aluminum wire and aluminum drum both of which are immersed in water. When a voltage is applied between the wire and drum, an arching discharge takes place between them, inducing electro-plasmic reaction. The reaction produces hydrogen and oxygen gas and aluminum oxide. The arcing between the wire and drum helps remove the oxide layer formed on the wire tip, exposing fresh aluminum to the water. Thus, a continuous generation of hydrogen gas is possible when the wire is fed against the drum.

This process has two major disadvantages. First, since the process is slow, the heat generated from the reaction is wasted by being dissipated through the water. Second, the electrical energy required to sustain the reaction is rather high. It is estimated that around 20 KJ of electrical energy is consumed to generate about 5 liter of hydrogen gas at room temperature and a pressure of one atmosphere.

SUMMARY OF THE INVENTION

Accordingly an object of this invention is to provide a safe and economic source of hydrogen gas for use as fuel.

Another object of this invention is to provide a method of rapidly generating heat and hydrogen gas for use as fuel.

A further object of this invention is to provide a means of generating small or large quantities of hydrogen gas.

Yet another object of this invention is to provide a method of generating hydrogen gas by using a relatively small amount of electrical energy to initiate a reaction between aluminum or aluminum alloy powder and water.

A still further object of this invention is to provide a safe and efficient method of generating heat.

These and other objects of this invention are achieved by providing;

a method of generating hydrogen gas and useful heat energy by (1) applying a high power pulse of electrical current to a metal electrical conductor causing the metal conductor to explode and thus disperse pieces of molten metal into a mixture of water and an aluminum fuel powder which is (a) aluminum metal powder or (b) an aluminum alloy powder, wherein the pieces of dispersed metal from the exploded conductor provide hot spots which initiate a chemical reaction between the aluminum fuel and water to generate hydrogen at high pressure in a confined first chamber;

(2) continuing to supply the high powered pulse of electrical current to drive the reaction between the aluminum fuel and water after the metal conductor has exploded;

(3) allowing the reaction between the aluminum fuel and water to go substantially to completion;

(4) releasing the reaction mixture into a larger second chamber to complete the reaction;

(5) extracting useful heat energy from the reaction mixture by means of a heat exchanger; and (6) separating the hydrogen gas from the remainder of the cooled reaction mixture.

BRIEF DESCRIPTION OF THE DRAWING FIGURES

A more complete application of this invention, and many of the attendant advantages thereof, will become readily apparent as the same becomes better understood by reference to the following detailed description when considered in conjunction with the accompanying drawings, wherein.

Figure 2A:
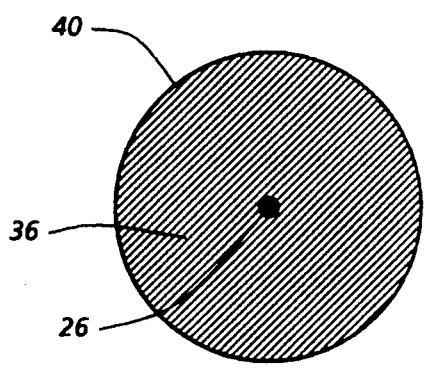
FIG. 2A shows a top view schematic drawing.
Figure 2B:
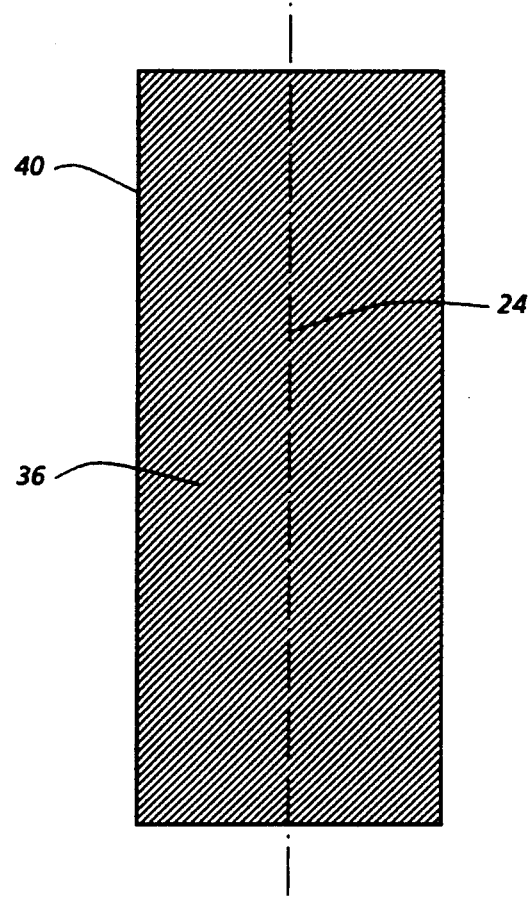

FIG. 2B a side view schematic drawing of a typical reaction cartridge used in this invention.

DETAILED DESCRIPTION OF THE PREFERRED EMBODIMENT

The apparatus and method of this invention rapidly generates useful heat energy and hydrogen gas from reactants that are very safe to store. This is accomplished by applying pulse power techniques to a system of a metal trigger (conductor) wire or wires and an aluminum fuel powder/water mixture in a first confined reaction chamber which is preferably in the form of a replaceable reaction cartridge. The electrical energy in the pulse form explodes the trigger wire which disperses molten or vaporized metal pieces into the aluminum fuel powder/water mixture. This initiates a chemical reaction between the aluminum fuel powder and water which generates a high temperature, high pressure reaction product mixture of hydrogen and metal oxides. After the reaction is substantially completed, the reaction mixture is released into a second larger chamber having an interior volume substantially larger than the interior volume of the first confined chamber. The volume of the interior of the second chamber is preferably from 10 to 100, more preferably from 35 to 65, and most preferably about 50 times greater than the volume of the interior of the first confined chamber (or reaction cartridge). The pressure of the reaction mixture is lowered proportionally in the transfer from the first chamber to the larger second chamber. In the second chamber, the reaction mixture comes into contact with a heat exchanger having a large surface area. The heat exchanger is used to extract useful heat energy from the reactant mixture. The cooled hydrogen is then separated from the remaining reaction products.

The aluminum fuel components are finely powdered aluminum metal or finely powdered aluminum alloys. Among the aluminum alloys, aluminum-lithium alloys and aluminum-magnesium alloys are preferred. The aluminum-lithium alloys contain from more than zero to 3.0, preferably from 2.0 to 3.0, more preferably from 2.0 to 2.8, and still more preferably from 2.2 to 2.6 weight percent of lithium, with the remainder of the alloy consisting essentially of aluminum. The aluminum-magnesium alloys contain from more than zero to 5.0 and preferably from 3.0 to 4.5 weight percent of magnesium with the remainder of the alloy consisting essentially of aluminum. As the amount of lithium or magnesium added to the aluminum is increased, the amount of electrical energy required to initiate and cause the complete reaction between the metal fuel and water is decreased.

The most preferred oxidizer is water. Water is inexpensive, nontoxic, noncaustic, nonexplosive, and thermally stable. Moreover, water is stoichiometrically efficient. The oxygen is used up in the oxidation of the aluminum fuel powders and the hydrogen is released as a gas useful as a fuel. The stoichiometric amount of water which will react with the aluminum, aluminum-lithium alloy, or aluminum-magnesium alloy powders is calculated according to the following equations:

$$2 Al + 3 H_2O \rightarrow Al_2O_3 + 3 H_2 \qquad (1)$$

$$Mg + H_2O \rightarrow MgO + H_2 \qquad (2)$$

$$2 Li + H_2O \rightarrow Li_2O + H_2. \qquad (3)$$

Preferably from about 90 to about 115, more preferably from 95 to 110, and still more preferably about 100 percent of the stoichiometric amount of water is used in the aluminum fuel powder/water slurry. Even greater variation from the stoichiometric amount of water will produce an operative slurry, but the efficiency of the process will be significantly reduced. The metal conductor trigger wire provides additional reactive metal, but this will be a small amount. In examples 1, 2, and 3, the aluminum in the conductor trigger wire was 0.82, 0.63, and 1.25 weight percent of the aluminum fuel powder, respectively. Note that equal weights of aluminum powder and water produce a slurry with only a slight stoichiometric excess (less than 0.3 Percent) of aluminum. Thus, in a system using an aluminum trigger wire and equal weights of aluminum powder and water, there will be a stoichiometric excess of a few percent aluminum. This may be ignored or the weight of water used may be increased a few percent to compensate for it.

For greater energy efficiency with minimum amounts of water it is critical that the aluminum fuel powder is uniformly distributed throughout the water. This can be conveniently done by adding an absorbent ceramic material such as bundles of fine ceramic fibers or ceramic sponges which prevent the separation of the aluminum fuel powder and water. The ceramic materials are light weight, electrically nonconductive, and inert. In other words, they add little weight, do not change the resistance properties, and do not interfere with the chemical reactions of the aluminum fuel powder/water mixture. The ceramic materials also have very high melting points and boiling points. Therefore the ceramic materials will not melt or vaporize during the high temperature reactions. Of the ceramic materials, alumina (mp 2015° C.; bp 2980° C.) is most preferred. An example of these ceramic materials are the fine alumina fiber bundles which are available in sheets or mats under the tradename SAFFIL (alumina fiber mat), manufactured by Imperial Chemical Industries, Ltd., Mond Division, Runcorn, Cheshire, WA74QS, United Kingdom. The fine ceramic fibers or ceramic sponges are thoroughly and uniformly mixed into a slurry of the aluminum fuel powder and water components. The fine ceramic fiber bundles or ceramic sponges absorb the water and aluminum fuel powder particles by capillary action. The fine ceramic fiber bundles (or ceramic sponges) create small spaces in which the aluminum fuel powder and water are held. This prevents the aluminum fuel powder from settling out of the water.

Using the absorbent ceramic material (e.g., fine fiber bundles or sponges) to take up and hold the water and metal fuel powder mixture is like using Kleenex facial tissue to remove water from a bowl. The tissue absorbs and becomes saturated with the water. When the tissue is removed it takes the water with it. If not enough tissue is used, water remains in the bowl. In the present case, the ideal situation is when all of the aluminum fuel powder/water slurry is absorbed and all of the absorbent ceramic material is saturated. The process, however, will still be operative when more or less than the ideal amount of absorbent ceramic material is used. The fine ceramic fibers or ceramic sponges are added in an amount of preferably from about 0.5 to about 3.0, more preferably from 0.5 to 2.0, still more preferably from 0.8 to 1.5 weight percent based on the weight of the dry aluminum fuel powder. Fine fibers are the more preferred form of the ceramic materials. The fibers will preferably have a diameter of less than 20 microns. The length of the fibers is not critical although longer fibers (e.g., 0.25 inches to several inches) are preferred. Other forms of the ceramic materials should be of comparable dimensions.

FIGS. 2A (top view) and 2B (side view) are schematic drawings showing a cylindrical reaction cartridge 40 which is made of a nonconductive polymer (e.g., polyethylene). FIGS. 2A and 2B also show a round metal conductor trigger wire 24 running lengthwise down the center of the cartridge 40 and the aluminum fuel powder/water slurry 36 filling the space between the wire 24 and the cartridge 40. The ratio of the cross-section of the wire ($C_w$) to the cross-section of the slurry ($C_s$) is proportional to the ratio of the volume of the wire ($V_w$) to the volume of the slurry ($V_s$). In the preferred embodiment using an aluminum wire and an aluminum powder/water slurry, the ratio of $C_w$ to $C_s$ is also proportional to the weight of aluminum in the wire ($W_w$) to aluminum in the slurry ($W_s$). Table 1 summarizes the $C_w/C_s$ ratios used in example 1, 2, and 3.

TABLE 1

| Example | $C_s/C_w$ | $d_s/d_w$ | $W_s/W_w$ | $W_w$ as % of $W_s$ |
|---|---|---|---|---|
| 1 | 527:1 | 23:1 | 149:1 | 0.67 |
| 2 | 625:1 | 25:1 | 173:1 | 0.58 |
| 3 | 225:1 | 15:1 | 67:1 | 1.5 |

$C_w$ = cross-section wire
$C_s$ = cross-section slurry
$d_w$ = diameter wire
$d_s$ = diameter slurry
$W_w$ = weight of aluminum in wire
$W_s$ = weight of aluminum powder in slurry $C_w$ = cross-section wire
$C_s$ = cross-section slurry
$d_w$ = diameter wire
$d_s$ = diameter slurry
$W_w$ = weight of aluminum in wire
$W_s$ = weight of aluminum powder in slurry The maximum ratio of $C_s$ to $C_w$ is preferably 625:1, more preferably 400:1, and still more preferably 100:1. The preferred minimum ratio of $C_s$ to $C_w$ (~3.2:1) is selected to keep the weight of the aluminum in the wire at less than 5 percent of the weight of the aluminum metal powder in the slurry.

The reactions between aluminum, lithium, or magnesium in the aluminum fuel powder and water are initiated and sustained by an electrical discharge through the aluminum fuel powder/water mixture (slurry). This is preferably done by placing the aluminum fuel powder/water mixture in a sealed reaction chamber between two electrodes and passing the current between the electrodes through the mixture. This is facilitated by connecting the electrodes with a conductor wire which passes through the aluminum fuel powder/water mixture. The conductor wire can be made of any electrically conductive material. Preferably a metal such as, gold silver, iron, nickel, tungsten, steel, magnesium, brass, copper, aluminum or aluminum-lithium alloys may be used. More preferably aluminum, aluminum-lithium alloy, or aluminum-magnesium alloy wires are used. Aluminum wires are most preferred because they are inexpensive and produce the same waste products as the aluminum fuel powder. A number of fine conductor wires may be used instead of a single large conductor wire. This permits a more uniform placement of conductor wire throughout the mixture of aluminum fuel/water. The total weight of the conductor wire or wires is preferably from about 0.5 to less than 5 and more preferably from 0.5 to 2.0 weight percent of the aluminum fuel powder in the aluminum fuel powder/water slurry mixture.

The electrical discharge explodes the conductor wire(s) which in turn provides hot spots of molten material throughout the premixed aluminum fuel powder/water mixture. Note that the use of a number of fine conductor wires provides a more uniform distribution of these hot spots throughout the aluminum fuel powder/water mixture. However, the large single wire is less expensive to use and less susceptible to being damaged. The chemical reaction between the aluminum fuel powders (aluminum metal or aluminum alloy powders) and water is first triggered at the hot spots and propagates to the surrounding materials because the reaction is highly exothermic. Therefore most of the aluminum fuel powder is activated by chemical means rather than electrical means. Nonetheless, the provision of hot spots by the exploding conductor does not necessarily sustain the aluminum fuel powder/water reaction. The sustaining requires a prolonged discharge of the electrical energy through the medium even after the reaction is triggered.

The electrical discharge parameters are as follows. Aluminum wires requires 10 KJ per gram of aluminum to explode. Most preferably the wire explodes when the discharge current is near its maximum and most preferably about 50 percent of the discharged electrical energy is used to explode the conductor wire. Thus, a minimum of 20 KJ per gram of the aluminum trigger conductor wire is used in the discharge. If more than the minimum amount of electrical energy is used, the percentage of it used to explode the metal (e.g., aluminum) conductor will decrease proportionately. Thus, if 40 KJ per gram of aluminum conductor wire is used, 25 percent (10 KJ) of the electrical energy is used to explode the wire. If less than 20 KJ is used, the explosion will occur after maximum current and the reaction may be incomplete. At the moment the trigger conductor wire explodes, the ratio of the electrical current to the trigger wire cross section is about 2 mega-amperes per square centimeter. The length of the electrical pulse for the case where capacitor bank is used as power source is determined by the stored energy (determined by capacitance and bank voltage), the inductance of the electric circuit, and the time-dependant resistance of the reacting material (wire/powder/water). Other power sources such as battery, homopolar generator, and flux compressor can be used with incorporation of proper power conditioners. The range of pulse width is preferably from about 10 to about 2,000 microseconds, more preferably from 50 to 1,000 microseconds, and still more preferably from 100 to 500 microseconds. Another parameter is the discharged energy per gram of aluminum fuel powder in the aluminum fuel powder/water mixture. Preferably 0.300 KJ or more of electrical energy per gram of aluminum fuel powder is used to assure a complete reaction. Note that these energy requirements are based on aluminum. The energy requirements for aluminum-lithium alloy and aluminum-magnesium alloy trigger conductor wires and fuel powders are even lower. The system will still operate using a large excess of electrical energy. For example, 15 KJ per gram of aluminum fuel powder will work well. However, using a large excess of electrical energy requires heavier equipment without substantially improving performance. The cost of the process will also be substantially increased.

Figure 1:
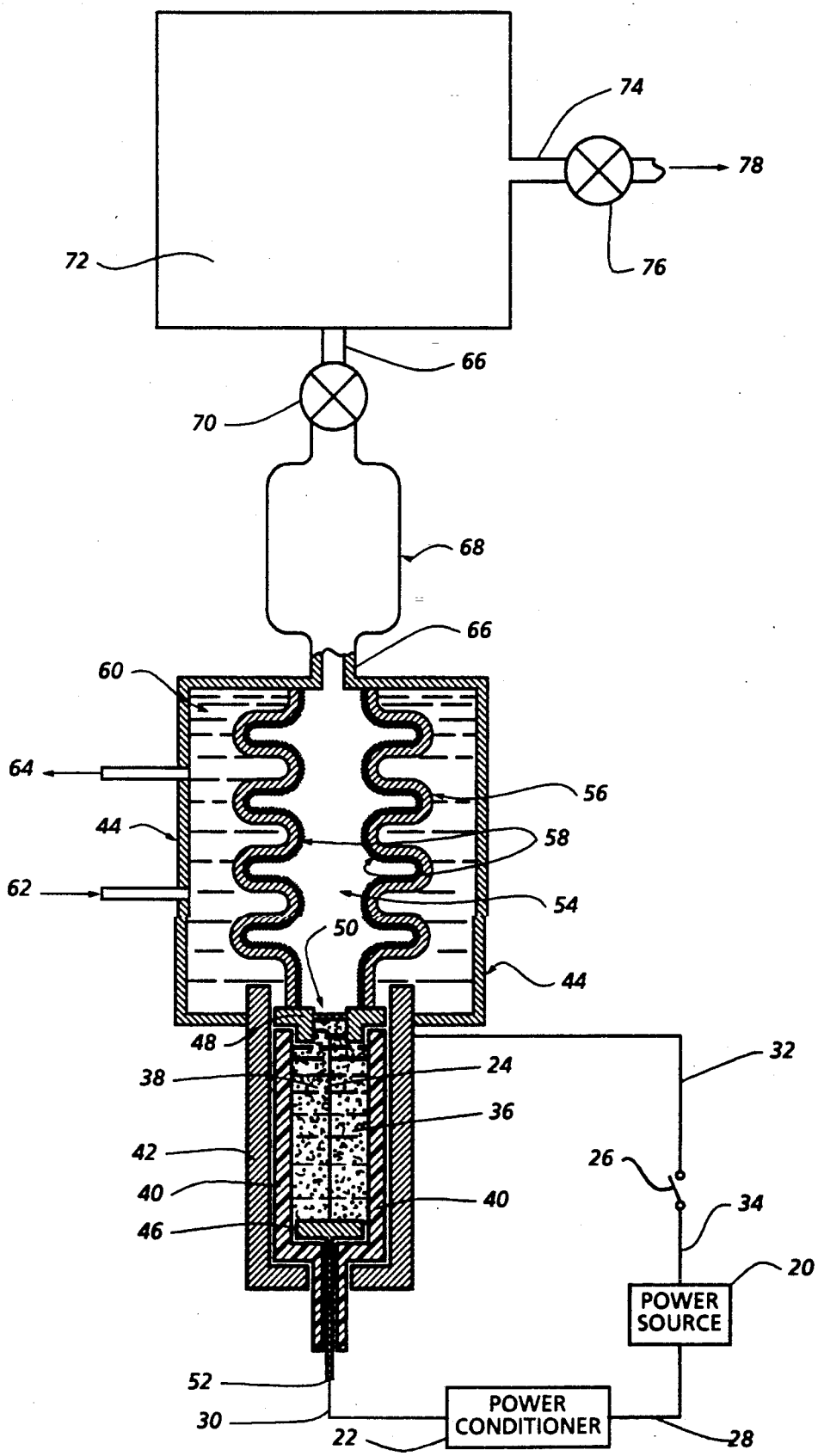
FIG. 1 is a cross-sectional schematic drawing (not to scale) of the test apparatus used to demonstrate the invention.

FIG. 1 is a schematic drawing (not to scale) representing typical equipment used to demonstrate the present invention. The electric circuit which provides the high energy electrical pulse comprises a power source 20, a power conditioner 22, a metal conductor trigger wire 24, and a fast switch 26, all of which are connected in series by electric cables 28, 30, 32, and 34. The trigger wire 24 is placed in the aluminum fuel powder (aluminum powder, aluminum-lithium alloy powder, or aluminum-magnesium powder)/water mixture 36 and both are enclosed in the interior 38 of a cylindrical reaction cartridge 40. The cylindrical reaction cartridge 40 is made of an electrical insulator such as polyethylene. The reaction cartridge 40 (or confined first reaction chamber) is put in a stainless steel housing 42. A second chamber 44 is connected to the top of the steel housing 42 and completes the enclosure of the reaction cartridge 40. A brass electrode 46 is threaded into the bottom of the reaction cartridge 40 and a second brass electrode 48 is threaded into the top of the reaction cartridge 40. In the center of the top of the reaction cartridge 48 is a breakable brass membrane 50 which separates the interior 38 of the reaction cartridge 40 from the interior 54 of a heat exchanger 56 in the second chamber 44. In this embodiment, the volume of the interior 54 of the heat exchange 56 is also the effective interior volume of second chamber 44. When the reaction is substantially completed the pressure of hydrogen gas in the interior 38 of the reaction cartridge 40 breaks the brass membrane 50 allowing the hydrogen gas and other reaction products to flow into the interior 54 of the heat exchanger 56. FIG. 1 is not drawn to scale and the interior 54 of the heat exchanger 56 is much larger (for example about 50 times larger) than the interior 38 of the reaction cartridge 40. The interior wall of the heat exchanger 56 is coated with a thin protective layer of unreactive ceramic material 58 (for example, alumina). The heat exchanger 56 extracts heat from the reaction products and transfers it to the water 60 which fills the space between the outer surface of the heat exchanger 56 and the inner surface of the second chamber 44. Cool water is fed through water inlet 62 into the second chamber 44 and steam or hot water is taken out from outlet 64. After the hydrogen is cooled, valve 70 is opened and the hydrogen is taken from the interior 54 of the heat exchanger 56 through exit line 66 and filter 68 into holding tank 72. During the cooling of the reaction products, the solid reaction products ($Al_2O_3$ $Li_2O$, MgO) solidify and are easily removed by filter 68. Exit line 74 connects the holding tank 72 to the device 78 which will use the hydrogen. A control valve 76 controls the flow of hydrogen through exit line 74.

The series electrical circuit as shown in FIG. 1 can be summarized as follows. The power source 20 is connected by electric cable 28 to the power conditioner 22 which is connected by an electrical cable 30 to a high current connection 52 on the brass electrode 46 at the bottom of the reaction cartridge 40. The brass electrode 42 is connected to the other brass electrode 48 at the top of the cartridge 40 by means of the metal trigger conductor wire 24 which passes through the center of the metal fuel/water mixture 36. The brass electrode 48 at the top of the cartridge 40 is in electrical contact with the stainless steel chamber housing 42 which provides an electrical return path to electrical cable 32 which is connected to one terminal of fast switch 26. The other terminal of the fast switch 26 is connected by electric cable 34 to the power source 20 thus completing the series.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

The oxidation reaction of aluminum powder (40 micron in diameter) with water was triggered by allowing an electrical current pulse to pass through an aluminum wire embedded in the mixture of the metal powder and water (alumina fiber was added to ensure uniform distribution of the powder and water). The bore size of the cartridge 40 was 5 cm long and 1.9 cm in diameter. The weight of the aluminum powder and water was 11 gm for each. The size of aluminum wire was 5 cm and 0.83 mm in diameter (weighed about 75 mg). The wire 24 and the mixture 36 were placed in a circuit arrangement as shown in FIG. 1. The stored energy in the power source 20 was 4.8 KJ. The total discharge time was about 300 microseconds. The discharge triggered the chemical reaction in the reactants, producing about 165 KJ of thermal energy and about 15 liter of hydrogen gas at room temperature and ambient pressure.

EXAMPLE 2

Basically this is the same test as example 1 except the following parameters. The bore size of the cartridge 40 was 5 cm long and 2.5 cm in diameter. The weight of aluminum powder and water was 19 gm each. The size of aluminum wire was 5 cm long and 1 mm in diameter (weighed about 110 mg). The total stored electrical energy was 7.5 KJ. The chemical reaction triggered by the pulse application produced 285 KJ of thermal energy and 25 liter of hydrogen gas at room temperature and ambient pressure.

EXAMPLE 3

The following parameters are different from those in the example 1. The bore size of the cartridge was 9 cm long and 1.6 cm in diameter. The weight of aluminum powder and water was 16 gm for each. The size of aluminum wire was 9 cm long and 1.1 mm in diameter (weighed about 240 mg). The total stored electrical energy was 4.8 KJ. The reaction produced 240 KJ of thermal energy and 21 liter of hydrogen gas at room temperature and ambient pressure.

Obviously, numerous modifications and variations of the present invention are possible in light of the foregoing teachings. It is therefore to be understood that within the scope of the appended claims the invention may be practiced otherwise than as specifically described herein.

What is claimed as new and desired to be secured by Letters Patent of the United States is:

1. A method of generating hydrogen gas and useful heat energy, comprising the following steps in order:
    (1) applying a high power pulse of electrical current to a metal electrical conductor causing the metal conductor to explode and thus disperse the metal into a mixture of water and an aluminum fuel powder which is
        (a) aluminum metal powder or
        (b) an aluminum alloy powder,
    wherein the pieces of dispersed metal from the exploded conductor provide hot spots which initiate a chemical reaction between the aluminum fuel and water to generate hydrogen gas at high pressure and temperature in a confined first chamber;
    (2) continuing to supply the high powered pulse of electrical current to drive the reaction between the aluminum fuel and water after the metal conductor has exploded;
    (3) allowing the reaction between the aluminum fuel and water to go substantially to completion;
    (4) then releasing the reaction mixture into a larger second chamber to complete the reaction;
    (5) extracting useful heat energy from the reaction mixture by means of a heat exchanger; and
    (6) separating the hydrogen gas from the remainder of the cooled reaction mixture.

2. The method of claim 1 wherein the metal electrical conductor is made of aluminum, an aluminum-lithium alloy, or an aluminum-magnesium alloy.

3. The method of claim 2 wherein the metal electrical conductor is composed of aluminum.

4. The method of claim 2 wherein the metal electrical conductor is composed of an aluminum-lithium alloy.

5. The method of claim 2 wherein the metal electrical conductor is composed of an aluminum-magnesium alloy.

6. The method of claim 1 wherein aluminum fuel is an aluminum powder.

7. The method of claim 1 wherein the aluminum fuel powder is an aluminum-lithium alloy powder.

8. The method of claim 1 wherein the aluminum fuel powder is an aluminum-magnesium alloy powder.

9. The method of claim 1 wherein the weight of the metal electrical conductor is from about 0.5 to about 5.0 percent of the weight of the aluminum fuel powder.

10. The method of claim 9 wherein the weight of the metal electrical conductor is from 0.6 to 2.0 percent of the weight of the aluminum fuel powder.

11. The method of claim 1 wherein from about 90 to about 115 percent of the stoichiometric amount of water needed to react with the aluminum fuel powder is used.

12. The method of claim 11 wherein from 95 to 110 percent of the stoichiometric amount of water needed to react with the aluminum fuel powder is used.

13. The method of claim 12 wherein about 100 percent of the stoichiometric amount of water needed to react with the aluminum fuel powder is used.

14. The method of claim 1 wherein the aluminum fuel powder is uniformly distributed throughout the water in the aluminum fuel powder/water mixture by means of an absorbent ceramic material that is electrically nonconductive and chemically inert.

15. The method of claim 14 wherein the absorbent ceramic material is made of alumina.

16. The method of claim 14 wherein the absorbent ceramic material is in the form of sponges.

17. The method of claim 14 wherein the absorbent ceramic material is in the form of bundles of fine ceramic fibers.

18. The process of claim 1 wherein the minimum energy in the electrical pulse is 20 KJ per gram of the metal conductor and 0.3 KJ per gram of aluminum fuel powder.

19. The method of claim 1 wherein from 30 to about 50 percent of the energy of the electrical pulse is used to explode the metal conductor.

20. The method of claim 1 wherein about 50 percent of the energy of the electrical pulse is used to explode the metal conductor.

* * * * *